United States Patent
Klingler

(10) Patent No.: US 6,746,081 B1
(45) Date of Patent: Jun. 8, 2004

(54) ANATOMICALLY DEFORMABLE SUPPORT

(75) Inventor: Knud Klingler, Engerwitzdorf/Schweinbach (AT)

(73) Assignee: Schukra Berndorf Ges. m.b.H., Berndorf (AT)

( * ) Notice: Subject to any disclaimer, the term of this patent is extended or adjusted under 35 U.S.C. 154(b) by 0 days.

(21) Appl. No.: 10/048,547

(22) PCT Filed: Jul. 26, 2000

(86) PCT No.: PCT/AT00/00206
§ 371 (c)(1),
(2), (4) Date: Jan. 31, 2002

(87) PCT Pub. No.: WO01/10670
PCT Pub. Date: Feb. 15, 2001

(30) Foreign Application Priority Data

Aug. 4, 1999 (AT) .............................................. 1343/99

(51) Int. Cl.[7] ................................................. A47C 7/46
(52) U.S. Cl. ........................ 297/284.4; 24/339; 403/326
(58) Field of Search ........................... 297/284.4, 284.7, 297/452.52, 452.55; 24/336, 339; 403/326, 327, 329, 364

(56) References Cited

U.S. PATENT DOCUMENTS

| | | | |
|---|---|---|---|
| 5,518,294 A | * | 5/1996 | Ligon, Sr. et al. ........ 297/284.4 |
| 5,769,491 A | | 6/1998 | Schwarzbich ............ 297/284.4 |
| 6,357,826 B1 | * | 3/2002 | Gabas et al. ............. 297/284.4 |
| 2002/0122690 A1 | * | 9/2002 | Poon et al. ................. 403/326 |
| 2002/0195854 A1 | * | 12/2002 | Hong ....................... 297/284.4 |

FOREIGN PATENT DOCUMENTS

| | | |
|---|---|---|
| EP | 0 780 262 | 6/1997 |
| WO | 95/19123 | 7/1995 |

* cited by examiner

Primary Examiner—Peter M. Cuomo
Assistant Examiner—Rodney B. White
(74) Attorney, Agent, or Firm—Robert C. Haldiman; Grant D. Kang; Husch & Eppenberger

(57) ABSTRACT

An anatomically deformable support and, in particular, a lordosis support, is provided for use with seats, couches or the like. The anatomically deformable support includes a frame, and an anatomically deformable supporting part connected to the frame and that can be arched in the reversible manner. The supporting part is connected to the frame by a connection arrangement including elongates cylindrical members, for example, wires, secured to the frame and first and second mounting arrangements provided at first and second end portions of the supporting part for securing the elongate cylindrical members to the supporting part. At least one of the mounting arrangements includes a first common rigid web member, and a pair of elastically flexible web members arranged on opposing sides of the rigid web member to form first mountings in which the elongate cylindrical members are received. The mounting arrangements are especially designed to prevent the elongate cylindrical members from gradually sliding out of the mountings.

14 Claims, 2 Drawing Sheets

ANATOMICALLY DEFORMABLE SUPPORT

BACKGROUND OF THE INVENTION

The subject matter of the invention is an anatomically deformable support, in particular a lordosis support, for seats, couches or the like with a frame that is connected to anatomic supporting part that can be arched in a reversible manner.

Supports that can be deformed corresponding to anatomic specifications, are being used in increasingly greater numbers. Apart from supports allowing a posture of the thigh that essentially avoids maximum pressure, the so called lordosis supports are of particular significance. Due to the preferred forward bent posture of the sitting person, the naturally intended forward concave curvature of the spinal column is displaced by an essentially convex outward curvature, leading, in addition to faster fatigue, also to pain and an undesirable deformation of the intervertebral discs. However, to hinder such undesirable yet partly involuntarily occurring curving of the spinal column, lordosis supports are provided both on couches and seats. To achieve the desired purpose, these lordosis supports must, however, suit the natural original curvature of the spinal column. Such lordosis supports can have a height adjustable construction so as to be able to suit the various spine lengths and consequently the lordosises of various heights. Such a height adjustment may be neglected, since, as a rule, geographic regions have a relatively sharp maximum of the possible heights. Of particular significance is, however, the convex formation of the lordosis, since for one height there are several curvatures and the support should be provided not only at one or two vertebrae of the spinal column, but an as large as possible number of vertebrae of the spinal column should be supported to achieve the desired purpose, namely to reduce fatigue and prevent pain. Such lordosis supports can have also asymmetric curvatures which are achieved, for example, by forming a support member from materials having different thicknesses in the direction parallel to the spinal column for the curvature of the support member.

Lordosis supports having various technical constructions are known. One of the most simple forms is by providing an inflatable cylinder in the possible region of the lordosis. Apart from the technical difficulty that a pump unit has to be provided to increase the lordosis support, due to the identical deforming forces along the arching the lordosis support will adapt itself to suit the already existing incorrect curvature of the spinal column.

In the case of a further lordosis support, two parts articulately joined can be shifted along a guide towards or away from one another. The disadvantage of this known lordosis support is that the curvature cannot be varied, so that a support of the lordosis is provided merely in a narrow range of the highest position, by virtue of which only one or two intervertebral discs will be supported and the other discs of the lordosis have to be arbitrarily adjusted again. Such a lordosis support is described, for example, in WO 95/19123.

A further embodiment of a lordosis support has an essentially flat supporting part, wherein the flat part has either cut-outs or has individual supporting elements arranged next to one another, which may have a construction that tapers outwards. The end regions of this flat supporting part can be moved towards one another, so that a curvature of the same can be achieved. By having various thicknesses according to EP 0 698 360 B, a desired asymmetric form, corresponding essentially to the lordosis, can be achieved.

The lordosis supports described above are, as a rule, connected to a frame, for example the squab of a seat, e.g. of a car seat. At the same time, the supporting part of the lordosis support is connected, for example, to a further frame, that has two external carriers which run essentially parallel to the spinal column, along which sliding elements can be displaced, for example for the lordosis support acting like a knuckle joint and on which transverse carriers are positionally fastened for the supporting part that can be arched.

This fastening of the supporting part on the outside carriers is of outstanding importance for the permanent fastening of the same. As a rule, the supporting part is not constructed integrally with the frame of the seat or the couch, but is manufactured separately from it. Depending on its dimensions the connection of the supporting part is either directly connected to the frame or by means of an intermediate part. This connection is an elastically deformable one. Such a connection is described, for example, an AT 402.145 B, whereby in the end regions of an anatomically deformable support undercut mountings are provided, into which wires can be pressed and a rigid web and an elastically deformable web are provided. The inside width of the mounting is smaller than the diameter of the wire connecting the two carriers.

In the case of two wires, they must be able to transfer the entire force, acting on the supporting part, to the frame. The result of this is that these wires have to be dimensioned to be thick, due to which on the one hand the forces that have to be applied during the curving of the supporting part, are relatively great, since during its arching the two end regions are moved towards on another, so that a deformation of these wires towards one another has to take place, whereby the supporting forces of the lordosis are so great that a matching of the actually required curvature cannot always be carried out in the required manner. To enable an easier matching of the supporting parts and to simultaneously facilitate the mounting of these wires, the use of at least two wires instead of each single wire at one or both end regions of the supporting part is known. Such a solution is described, for example, in EP 0 780 262 A1. In the case of this lordosis supporting part a mounting for two wires is provided at both end regions, while the mounting is divided into two by a flexible web. The inside width of the mounting is smaller than the sum of the diameters of the two wires. Since the depth of the mounting is greater than the diameter of the wires, when one wire is on the bottom of the mounting not only can the other wire be easily introduced into the mounting, but it can also be removed from the mounting by using the least possible force; merely the flexible part has to be bent slightly as the construction of the two webs bounding the mounting essentially rigidly is only slightly reinforced. Accordingly, when curving the supporting part, necessitating a different position of the two wires relative to their openings, preferably one wire can slide out from the mounting. After the wire leaves the mounting, the flexible web is no longer in the position to act as a boundary of the discharge opening from the mounting for the further wire, the opening being smaller than the diameter of the wire, so that after the exit of the first wire from the recess the second wire can exit from the mounting with the least force. If both wires are simultaneously moving out of the recess, then merely a force of 60 kp per cm of the recess has to be exerted for both.

From WO 95/19123 a lordosis support is known, that has no supporting part that can be arched but two arms articulately jointed with one another. The ends of the arms can move relative to one another and the other ends are connected via rails having two cylindrical mountings. Instead of the two cylindrical mountings this rail, serving as a sole lordosis support, can be formed by two adjacent partly cylindrical mounting which are formed by a common rigid central part and externally situated continuous partly cylindrical elastic webs, so that the metal arms can be pressed into them. The forces acting on this rail during use are always such that the wire brackets can be pressed into the recess. No forces act in the opposite direction.

SUMMARY OF THE INVENTION

The object of the invention is to produce an anatomically deformable support, that allows not only a punctiform or linear support of body parts but a flat support of parts of the human body, in particular of the spinal column. It is a further objective to fasten the supporting part on a frame in such a manner that relatively small displacement forces need to be applied to achieve the desirable curvature. A further objective is to simplify the automatic production, thus enabling a wide usage, in particular for seats of transport means, like in earthbound motor vehicles but also on aeroplanes. In additional objective of this invention is to make the forces, necessary to remove the lordosis support from its individual fastening wires, possibly great, so that a gradual sliding of the fastening wires out of the mounting(s) can be avoided in a simple manner even when the supporting part is curved, when great forces of various magnitude act on the adjacent wires. The functional reliability of the supporting part, when forces, not directly by the user, are acting should also be assured. In this conjunction the possible forward movement of transported goods during braking is particularly referred to; that act on the lordosis support against the direction of the intended usage, since there are no additional barriers.

The invention proceeds from the state-of-the-art as it is described in AT 402.145 B.

The essence of an anatomically deformable support according to the invention, in particular a lordosis support, for seats, couches or the like with a frame that is connected with an anatomically effective supporting part that can be arched in a reversible manner, with a side that can be covered by a cushion, facing the user, while a side situated opposite that side has mountings for cylinders having essentially circular sections, e.g. wires, and the essentially circular cylinders are preferably elastically deformable in their longitudinal direction and the supporting part is indirectly and/or directly connected to the frame, while the mountings are provided at least in one end region, in particular at least at one end of the supporting part, and has at least one opening, the inside width of which viewed perpendicularly to the longitudinal direction of the essentially circular cylinder Is smaller than said cylinder's diameter, is that at least two adjacent mountings are provided perpendicularly to the longitudinal direction of the essentially circular cylinder, each to accommodate one essentially circular cylinder, while the mountings are formed with a common rigid web thickened at its distal end and with an elastically flexible web.

By means of a supporting part that can be arched in a reversible manner to suit the anatomic requirements it can be achieved that not only a punctiform or linear support will be obtained, so that in the case of, for example, a lordosis support not only one vertebra but a plurality of vertebrae are supported. The circular cylinders, e.g. wires, glass fibre-reinforced polyester rods, but also hollow cylinders, through which other carrier elements are passed through, make a non-position-specific fixing of the fastening elements possible. If the circular cylinders can be elastically deformed in their longitudinal directions, then the curvature of the supporting part can be particularly simply affected by moving the two end regions towards one another. The anatomically effective supporting part can be either directly connected to the frame, for example with tension springs, or indirectly via an additional frame or longitudinal elements, which in turn are resiliently anchored in the frame. The mountings for the essentially circular cylinders have an opening, the inside width of which viewed perpendicularly to the longitudinal direction of the essentially circular cylinder is smaller than the cylinder's diameter, so that the cylinders can be pressed into the mounting and then fastened therein. If, when viewed perpendicularly to the longitudinal direction of the essentially circular cylinder, at least two adjacent mountings are provided each to accommodate one essentially circular cylinder, then two or more essentially circular cylinders, e.g. wires can be provided for the fastening of the anatomically effective supporting part, thereby making a simple automatic manufacture of the anatomically deformable support possible, since the forces acting on the anatomically effective supporting part can be transferred not to one, but to at least two wires, whereas the force required for connection during manufacture can be limited to one wire with a reduced resistance to deformation. By providing a common rigid web that is thicker at its distal end, the retention of the cylinder is made particularly simple and effective, while the elastically flexible web provided on both sides of the rigid web makes a simple mounting possible.

When at its thick distal end the rigid web has a particularly flat surface on that side that is averted from the bottom of the mounting, that surface enclosing with the longitudinal direction of the cross-section of the rigid web an acute angle, in particular from 60° to 80°, preferably from 75° to 80°, then it can be achieved that under a force acting against the intended use, the essentially circular cylinder is moved against the rigid part, thus necessitating increased forces for the removal.

When at its thick distal end the rigid web has a surface on that side that is averted from the bottom of the mounting, the tangent of which surface in the end region encloses with the longitudinal direction of the cross-section of the rigid web an acute angle, in particular from 60° to 80°, preferably from 75° to 80°, then even in the case of curved uneven surfaces of the distal end of the rigid part it is assured that particularly great forces have to be applied for the removal of the cylinder from the mounting.

When at its thick distal end the rigid web has a surface that encloses with the longitudinal direction of the cross-section of the rigid web an angle from 50° to 60°, then the cylinder can be pushed into the mounting with a particularly small force.

When by virtue of the thick distal end of the rigid web a hook is formed for the cylinder, then the cylinder can be particularly effectively retained in the recess.

When the opening extends freely transversely outside of the distal thickening, in particular of the hook, the transverse extent being greater than half of the diameter of the essentially circular cylinder, then it is assured that the cylinder during its removal will be pressed against the rigid web, so that a particular secure fastening of the cylinder in the mounting is affected.

When the inside width of the mounting outside of the thickened distal end of the rigid web, with the elastically flexible web undeformed, is smaller than the diameter of the essentially circular cylinder, then it is assured that the elastically flexible web will press the cylinder against the rigid web and consequently the force acting against the removal of the cylinder is determined by the dimensioning of the rigid web.

When the distal free end of the elastically flexible web has a particularly flat surface, that encloses with the longitudinal direction of the cross-section of the rigid web an angle from 50° to 60°, then the forces necessary for pressing the cylinder into the mounting can be kept considerably smaller than the forces necessary to press the cylinder out from the mounting.

When the elastically flexible web is tapered towards the distal end, then when fastening the supporting part in the frame a particularly small force is used at the commencement of the fastening.

BRIEF DESCRIPTION OF THE DRAWINGS

The invention is described in detailed in the following based on drawings.

They show in.

DETAILED DESCRIPTION OF THE INVENTION

Figure 1:
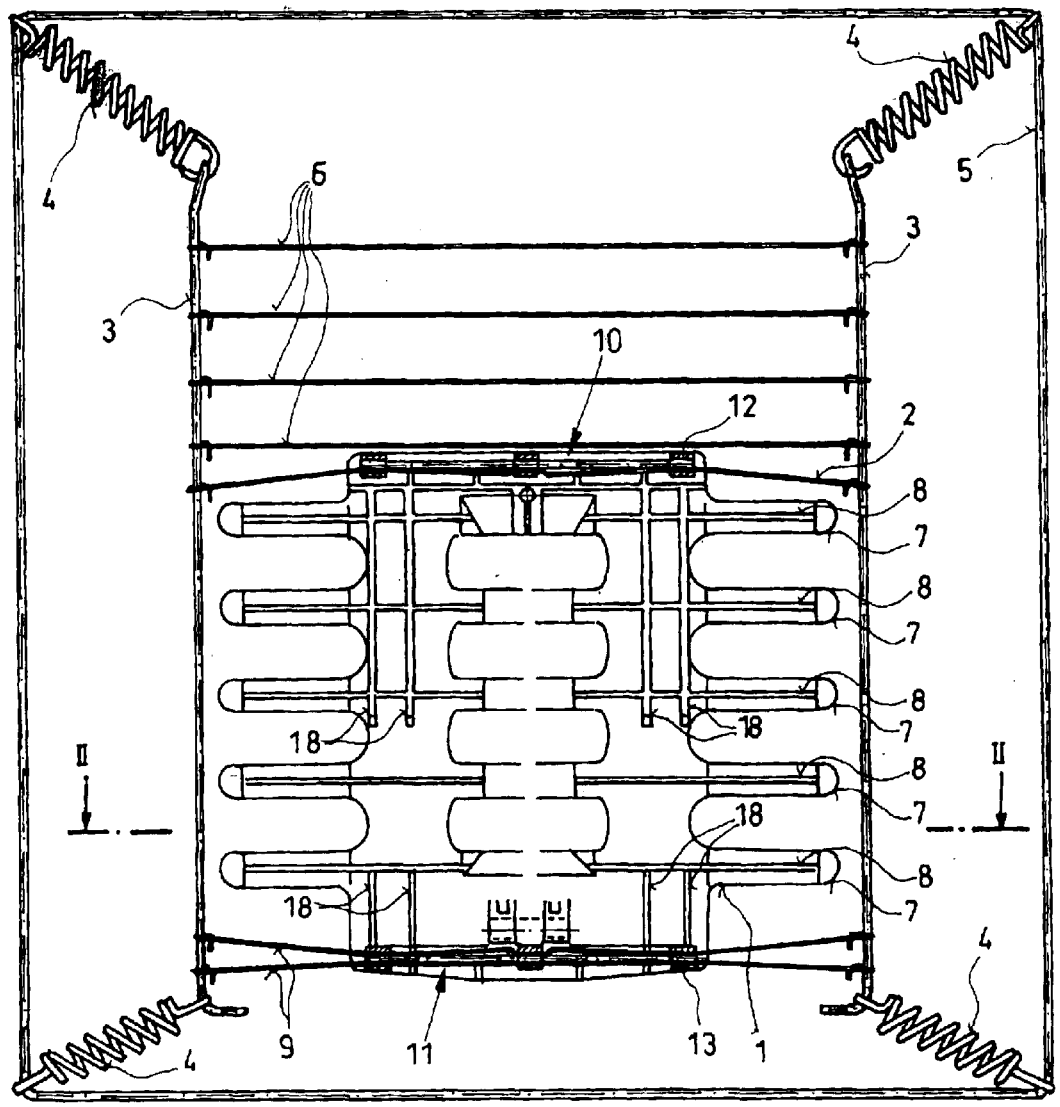
FIG. 1—a supporting part arranged in a frame, looking towards the back of the user, FIG. 2—a section in FIG. 1 along line II—II, FIG. 3—a section through the mounting of a supporting part in the upper region of the same, and FIG. 4—a section through the mounting of a supporting part in the lower region of the same.

A supporting part 1, illustrated in FIG. 1, is connected with carriers 3 by means of wires 2, 9, that have a circular cross-section and consequently represent a circular cylinder, the carriers running approximately parallel to the spinal column of a user. In turn these carriers are connected to a frame 5 via tension springs 4. This frame is constructed in accordance with the requirements, e.g. as a seating part of a car seat, as a lying part of a couch or also as a squab of a car seat so as to support the lordosis. The carriers 3 kept at a distance from one another by means of wires 6. Instead of metal wires other elements like, for example, plastic profiled sections, preferably reinforced with glass or carbon fibres, can be used, and cables may also be used. The supporting part 1 is made from a fibre-reinforced plastic and has on both sides single protruding supporting elements 7 that have webs 8 tapering towards their distal end, so that apart from the levering effect the deformability of the supporting elements is greater in the outer region than in the region nearer to the centre, thus guiding the body part of a user, in particular the back, to a desirable central position without creating by this places with increased pressure. At the top of the supporting part 1 is connected to the carriers 3 only by one wire 2, but at the bottom by two wires 9, all having a circular cross-section. The wires 9 are arranged on the carrier 3 distanced from one another, enabling production by machinery.

A Bowden cable (not illustrated in FIG. 1), can be so arranged in the supporting part 1, that both end regions 10, 11 are moved towards one another, resulting in an arching of the supporting part. Further webs 18, not fully passing through, affect a reinforcement of the supporting part 1, so that not a symmetrical, but an asymmetrical deformation of the same can take place, thus making the fitting of the supporting part to suit the natural shape of a lodosis simple.

Figure 2:
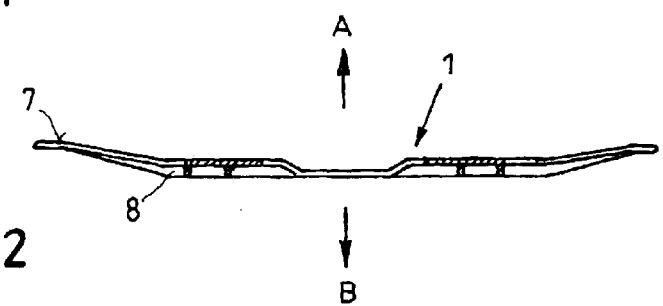

As it can be seen from FIG. 2, the supporting part 1 has a side A facing the user, that has an essentially flat construction without any discontinuities, whereas the opposite situated side B contains the webs, wires, Bowden cable, etc. Side A is covered by a cushion (not illustrated), so that a particularly great comfort is provided to the user. The supporting elements 7 are constructed with a dip towards the user, thus forming a sort of a trough, and a particularly high resilience in the end region of the supporting elements 7 by virtue of the webs 8 diminishing towards the distal end.

As it can be particularly clearly seen from FIG. 1, in its upper and lower end regions 10, 11, the supporting part 1 is fastened to the carriers 3 by means of wires 2 and 9 which are fastened in mountings 12, 13 in the supporting part. The supporting part is made from plastic material, but can also be formed from a mesh element, for example with steel springs, that are arranged transversely and longitudinally and are joined with one another, for example, by riveting.

Figure 3:
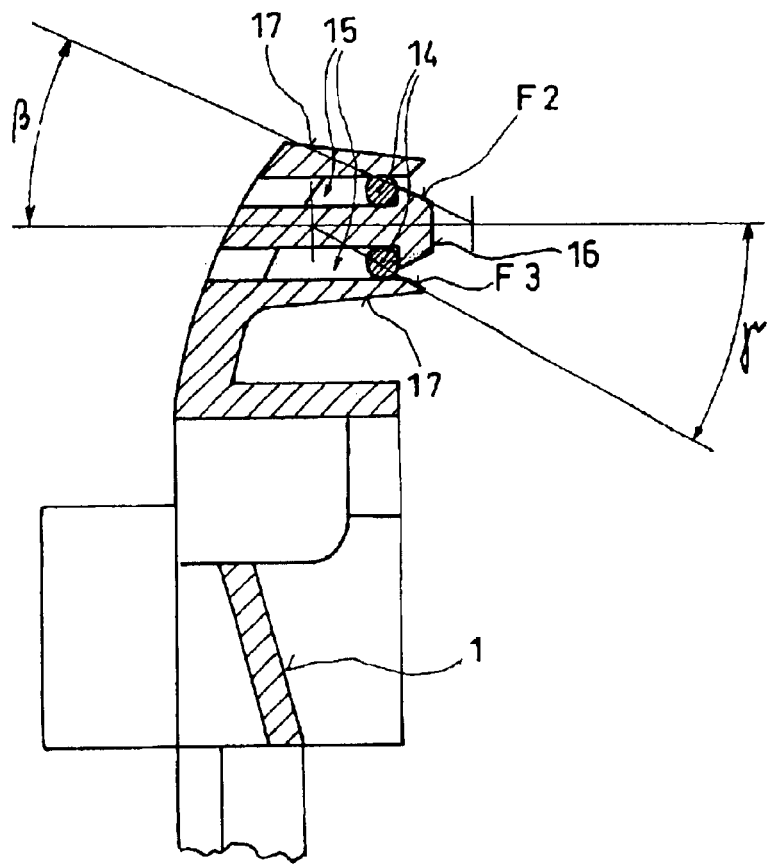
Figure 4:
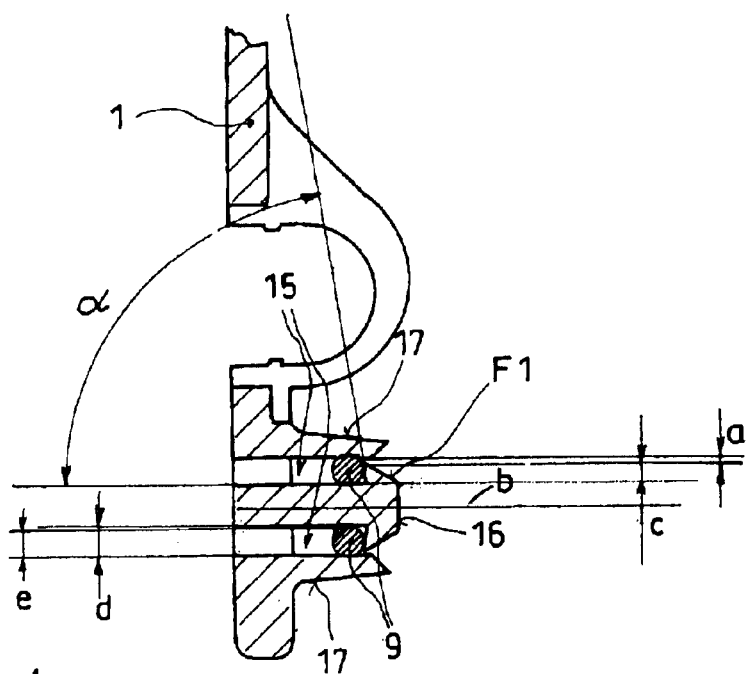

In FIGS. 3 and 4 an upper and lower mounting of the supporting part 1 is illustrated, in section, wherein in a manner different from FIG. 1 two wires 14 are provided in the upper mounting also. Two single mountings 15 each are provided, having a common rigid web 16 and bound externally by an elastically flexible web 17. The inside width a of the mounting is 0.5 mm and consequently approx. one third of the diameter d (1.6 mm) of the wires 14 and 9. The free extension c of the hook, formed by the distal thickening, is greater than half the diameter d of the wire. At its distal end the rigid web 16 is formed thicker (i.e. with an enlarged portion) thus forming a hook shape, while the surface F, encloses with a line parallel to the longitudinal direction b of the rigid web 16 an angle $\alpha$ of 80°. When the wires 9 and 14 are moved out of the mounting 15 they are guided by this surface F, and slide against the rigid web 16, so that the force for the removal of the wire is not determined by the force required to affect an elastic deformation of the deformable web 17, but by the stretch of the rigid web. On the outside of the distal thickening the mounting has an inside width e, that is smaller than the diameter d of the wire 9. Furthermore, by fastening each wire in its own mounting, no interdependence will occur, so that even in the case of extreme arching, a secure fastening of the supporting part in the carriers as well as in the frame is assured. At is free end the rigid web 16 has an essentially even flat $F_2$, that with the longitudinal direction b of the rigid web 16 encloses an angle $\beta$ of 55°. At its end the elastically flexible web 17 has a flat $F_3$, that with the longitudinal direction b of the rigid web 16 encloses an angle y of 60°. By this arrangement of the flats $F_2$ and $F_3$ a particularly simple fastening of the supporting part 1 on the wires and consequently on the carriers 3 and the frame 5 can be established, as the forces necessary for pressing in the wires can be kept particulary small due to the inclined flats, thus rendering these forces considerably smaller than the forces required to pull out the wires. The wires 9 and 14 have a diameter d of 1.6 mm and are pressed by the elastically flexible webs 17 against the rigid part. The force required to pull out a wire from the recess is 75 kp/cm, consequently for two wires 150 kp per 1 cm of the distal thickening of the rigid part. If required, the forces necessary to fasten the support to the wires can be increased by either a wider construction or by increasing the number of mountings.

What is claimed is:

1. A lordosis support comprising:

a supporting part having an upper and a lower portion;

first and second mounting openings disposed in one of said upper and lower portion of said supporting part, having a common rigid web member, and having first and second elastically flexible webs, wherein said first and second elastically flexible webs externally bind said common rigid web member; and wherein said common rigid web member has an enlarged distal end portion at said first and second mounting openings so as to narrow an inside width of each of said first and second mounting openings.

2. A lordosis support according to claim 1, wherein said enlarged distal end portion has at least one flat surface facing inwardly and towards a base end portion of said common rigid web member, said at least one flat surface forming an acute angle with a longitudinal direction of said common rigid web member.

3. A lordosis support according to claim 2, wherein said acute angle is in a range of 60 to 80 degrees.

4. A lordosis support according to claim 1, wherein said enlarged distal end portion of said first common rigid web member has at least one surface facing inwardly and towards a base end portion of said common rigid web member, a tangent of said at least one surface forming an acute angle with a longitudinal direction of said common rigid web member.

5. A lordosis support according to claim 4, wherein said acute angle is in a range of 60 to 80 degrees.

6. A lordosis support according to claim 1, wherein said enlarged distal end portion of said common rigid web member has at least one surface facing outwardly and away from a base end portion of said common rigid web member, and at least one flat surface forming an acute angle with a longitudinal direction of said common rigid web member.

7. An anatomically deformable support according to claim 1, wherein said enlarged distal end portion of said common rigid web member comprises at least one hook portion for retaining at least one wire.

8. A lordosis support comprising:

a frame;

first and second wires attached to said frame;

a supporting part having first and second mounting openings, said first and second mounting openings having a common rigid web, and first and second elastically flexible webs, wherein said first and second elastically flexible webs externally bind said common rigid web;

wherein said common rigid web member has an enlarged distal end portion at said first and second mounting openings so as to narrow an inside width of each of said first and second mounting openings; and wherein one of said first and second wires are disposed in one of said first and second mounting openings, and the other of said first and second wires are disposed in the other of said first and second mounting openings.

9. A lordosis support according to claim 8, wherein said enlarged distal end portion has at least one flat surface facing inwardly and towards a base end portion of said common rigid web member, said at least one flat surface forming an acute angle with a longitudinal direction of said common rigid web member.

10. A lordosis support according to claim 9, wherein said acute angle is in a range of 60 to 80 degrees.

11. A lordosis support according to claim 8, wherein said enlarged distal end portion of said first common rigid web member has at least one surface facing inwardly and towards a base end portion of said common rigid web member, a tangent of said at least one surface forming an acute angle with a longitudinal direction of said common rigid web member.

12. A lordosis support according to claim 11, wherein said acute angle is in a range of 60 to 80 degrees.

13. A lordosis support according to claim 8, wherein said enlarged distal end portion of said common rigid web member has at least one surface facing outwardly and away from a base end portion of said common rigid web member, and at least one flat surface forming an acute angle with a longitudinal direction of said common rigid web member.

14. An anatomically deformable support according to claim 8, wherein said enlarged distal end portion of said common rigid web member comprises at least one hook portion for retaining at least one of said first and second wires in one of said first and second mounting openings.

* * * * *